May 26, 1959   W. T. HARRIS   2,888,583
CIRCUIT ELEMENT TRANSDUCER
Filed Feb. 17, 1955
FIG. 1.
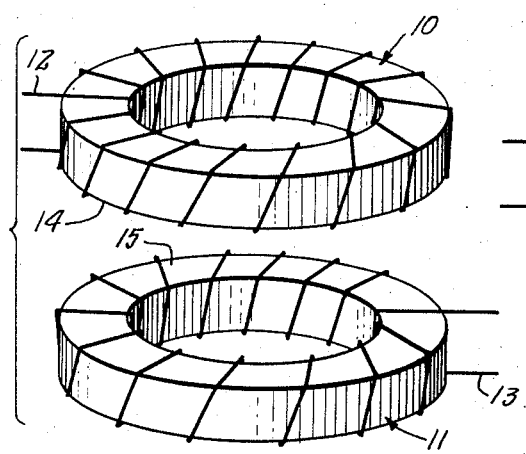
FIG. 2.
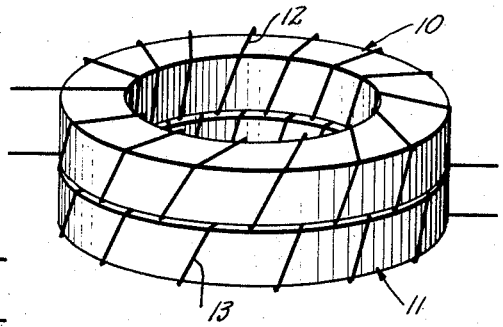
FIG. 3.
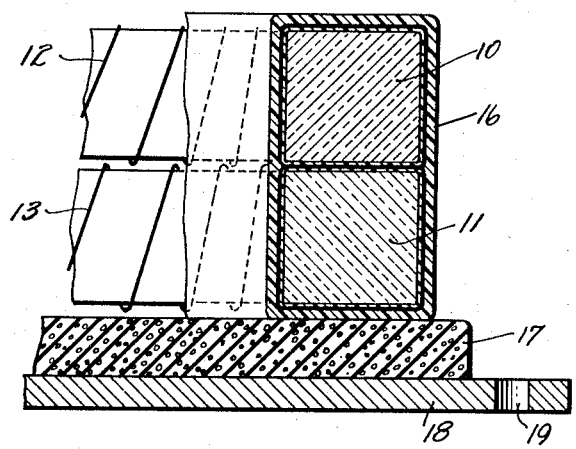
FIG. 4.
FIG. 5.
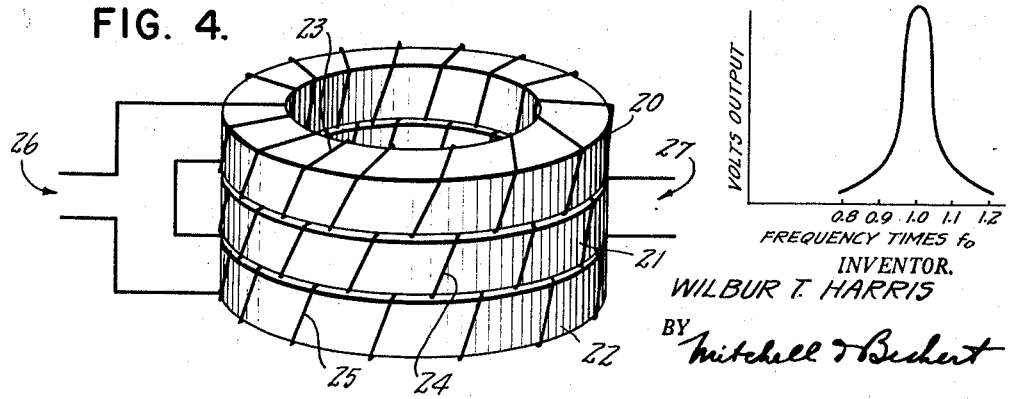
INVENTOR.
WILBUR T. HARRIS
BY *Mitchell & Bechert*
ATTORNEYS

United States Patent Office 2,888,583
Patented May 26, 1959

2,888,583

CIRCUIT ELEMENT TRANSDUCER

Wilbur T. Harris, Southbury, Conn., assignor to The Harris Transducer Corporation, Woodbury, Conn., a corporation of Connecticut Application February 17, 1955, Serial No. 488,830

14 Claims. (Cl. 310—26)

My invention relates to circuit-element transducers or filters of the variety in which independent electrical input and output circuits may be coupled solely by mechanical means. The invention incorporates certain improvements and modifications over that disclosed in my copending patent application Serial No. 301,554, filed July 29, 1952, now abandoned.

It is an object of the invention to provide improved means of the character indicated.

It is another object to provide an improved circuit-element transducer lending itself to design for response essentially at any selected frequency, out of a wide range of frequencies.

It is another object to provide a transducer meeting the above objects and inherently not susceptible to stray flux and other radiations.

It is a further object to meet the above objects with a transducer in which the impedance-transformation ratio or voltage gain between input and output circuits may be selectively provided with relative ease to meet a wide range of design requirements.

It is a general object to meet the above objects with a transducer construction which is rugged and reliable and which exhibits low loss when mechanically coupling two electrical circuits.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified perspective view of two parts of a transducer or filter incorporating features of the invention and shown prior to final assembly;

Fig. 2 is a view similar to Fig. 1, but showing the important parts upon assembly;

Fig. 3 is an enlarged fragmentary sectional view of an assembled transducer according to Figs. 1 and 2 in order to reveal the internal relation of parts and to show mounting details;

Fig. 4 is a view similar to Fig. 2 to illustrate a modification; and

Fig. 5 is a graphical representation of the frequency response of one of my transducers.

Briefly stated, my invention contemplates an improved circuit-element transducer or filter for coupling independent electrical input and output circuits solely by mechanical means. The mechanical coupling utilizes magnetostrictive properties, and, depending on design requirements, the device may have essentially a narrow-band response or essentially a broad-band response. By suitably proportioning the electrical circuits linked to the mechanical coupling, a wide range of impedance-transformation or voltage-gain ratios may be achieved to suit design requirements.

Referring to Figs. 1, 2 and 3 of the drawings, my invention is shown in application to a transducer comprising two independent magnetostrictive cores 10—11, each providing a continuous flux-loop path and with separate electrical windings 12—13 independently linked thereto. The cores may be consolidated stacks of laminations or they may be solid castings of magnetostrictive ceramic, such as ferrite; they may be square or any other shape, but, in the form shown, they are each annular and right-cylindrical. The design is such that they shall at least have corresponding faces, such as the underside face 14 of core 10 and the topside face 15 of core 11, for radial overlap when placed in intimate side-by-side adjacency, as depicted in Figs. 2 and 3. The windings 12—13 may be toroidally developed, the number of turns depending upon the desired impedance transformation ratio or voltage gain between the two electrical circuits involved. I prefer that the spacing of groups of turns for one winding as compared for that from the other winding shall be such as to permit no mechanical interference between individual turns of the respective windings when the two wound cores are secured together; this is suggested in Fig. 2 by the interlaced or staggered relation of individual turns of the respective windings.

To secure the two wound cores 10—11 together, I prefer simply to dip each wound core in a suitable bonding plastic, such as an epoxy-type resin, and thereupon immediately to clamp the coated core assemblies together in the relation depicted in Fig. 3, thereby effectively forming a single protective sheath 16 over the entire transducer and enveloping all winding turns. When the plastic has hardened, good mechanical coupling will be achieved between the two cores. By the nature of the toroidal electrical windings, these are coupled only to their respective cores, and no electrical cross-talk between windings is possible; neither can the windings respond to stray fluxes.

For mounting, I may simply employ a pressure-release mat or base 17, as of sponge rubber, to which one axial end of the transducer may be bonded. The mat 17 may, in turn, be bonded to a base plate 18 having suitable securing means 19, as will be understood.

The described device will be understood to respond to couple an input circuit including, say, the winding 12, to an output circuit, say, including the winding 13, solely through the mechanical bond between the cores. If the cores are of like dimensions, they will have like resonances, and a sharply peaked frequency response will be achieved, the particular frequency being of course determined by the mechanical dimensions selected for the cores; a typical response for such case is illustrated in Fig. 5, in terms of the characteristic frequency $f_0$ of the device. At resonance, the input or excited core will radially vibrate through magnetostrictive action, and the rigid bond between cores will assure sympathetic resonance of the other core, whereby an electrical output signal may be generated in winding 13. As indicated generally above, impedance transformation, voltage gain, etc. may be effected between input and output circuits by appropriate selection of turns ratios linked to the respective cores.

For broader-band response, the two cores 10—11 may be of different dimensions so as to exhibit different resonant properties. If the two cores have at least radially overlapping adjacent surfaces (14—15), a mechanical bond between input and output circuits may still be achieved, and the over-all response will include at least the resonant peaks of the individual cores, as well as the region therebetween, to an extent depending upon the frequency difference between the resonant peaks and the degree of mechanical bond.

In Fig. 4, I show a modification involving a plurality of wound cores exceeding two. The form shown happens to include three cores 20—21—22, and the several windings 23—24—25 independently linked to these cores may form parts of independent circuits. However, in the form shown, the two windings 23—24 for the outer cores are electrically coupled, as with the series connections shown, thus defining a first circuit 26 and a second circuit 27, the latter being merely the central winding 24. If the cores of Fig. 4 are bonded as described for Figs. 2 and 3, then the described arrangement makes possible even more effective mechanical coupling between the independent input and output circuits 26—27. The arrangement also affords more flexibility in provision of desired turns ratios between input and output circuits, as well as impedances and impedance ratios, depending upon whether coils 23—25 are connected in series or in parallel, as will be understood.

It will be seen that I have described simple yet highly efficient circuit-element transducers. The basic construction lends itself to flexibility of design for operation at selected frequencies and with selected impedances and impedance ratios extending over a wide range. Ferrite cores are to be preferred for the variety of shapes and sizes in which they can be made and for their inherent low eddy-current losses. Whatever the design or construction of my transducers, highly efficient coupling is achieved between independent electrical circuits through purely mechanical means.

While I have described the invention in detail for the preferred forms shown, it will be understood that modifications may be made within the scope of the invention as defined in the claims which follow.

I claim:

1. A circuit-element transducer, comprising first and second peripherally continuous closed magnetostrictive cores defining separate closed flux-loop core paths, separate electrical windings linked independently to each of said core paths, and means securing both wound cores in intimate adjacency, whereby electrical circuits including the respective windings linked to said core paths may be electrically independent and coupled solely by reason of mechanical coupling through said cores.

2. A circuit element transducer, comprising two annular magnetostrictive cores, independent electrical windings independently coupled to each of said cores, and means securing said cores in intimate side-by-side adjacency.

3. A transducer according to claim 2, and including mounting means including a layer of pressure-release material directly supporting the secured cores.

4. A transducer according to claim 2, and including mounting means comprising a rigid base member and a layer of pressure-release material bonded to said base member and bonded to one of said cores.

5. A transducer according to claim 2, in which said cores are of ferrite material, whereby eddy-current losses are minimized.

6. A circuit-element transducer, comprising two annular magnetostrictive cores having overlapping radii, a first winding coupled solely to a first core, a second winding coupled solely to a second core, and means permanently bonding the wound cores in side-by-side adjacency at points of overlapping radius.

7. A transducer according to claim 5, in which said bonding means is an epoxy-type resin.

8. In a circuit-element transducer, two annular magnetostrictive cores having overlapping radii, independent electrical windings independently toroidally wound on each of said cores, and means including a plastic permanently bonding the wound cores in side-by-side adjacency.

9. A circuit-element transducer, comprising two like magnetostrictive cores, each of said cores defining a closed flux-loop path and having a flat side against which the other core may be intimately fitted over a substantial area, independent electrical windings linked to said cores, and a sheath of plastic intimately coating all external areas of the wound cores and the windings and intimately bonding the flat surfaces of said cores together.

10. A transducer according to claim 9, in which said cores are each of right-cylindrical configuration, whereby the consolidated transducer may likewise be right-cylindrical.

11. A transducer according to claim 9, in which the number of turns of the winding linked to one core is equal to the number of turns of the winding linked to the other core.

12. A transducer according to claim 9, in which the number of turns of the winding linked to one core is different from the number of turns of the winding linked to the other core.

13. A circuit-element transducer, comprising three like annular magnetostrictive cores having like side faces for mutual abutment in side-by-side adjacency and axial alignment, first, second, and third electrical windings independently coupled to said cores, and means including a bonding plastic intimately bonding adjacent surfaces of the wound cores together in side-by-side adjacency.

14. A transducer according to claim 13, in which the windings of the outer cores are linked in a common circuit constituting a first circuit, whereby the winding linked to the intermediate core may constitute part of a second circuit, said first and second circuits being coupled solely by mechanical bond.

No references cited.